May 31, 1927.
P. ROOTS
DITCH GATE
Filed Aug. 20, 1926
1,630,407
2 Sheets-Sheet 1
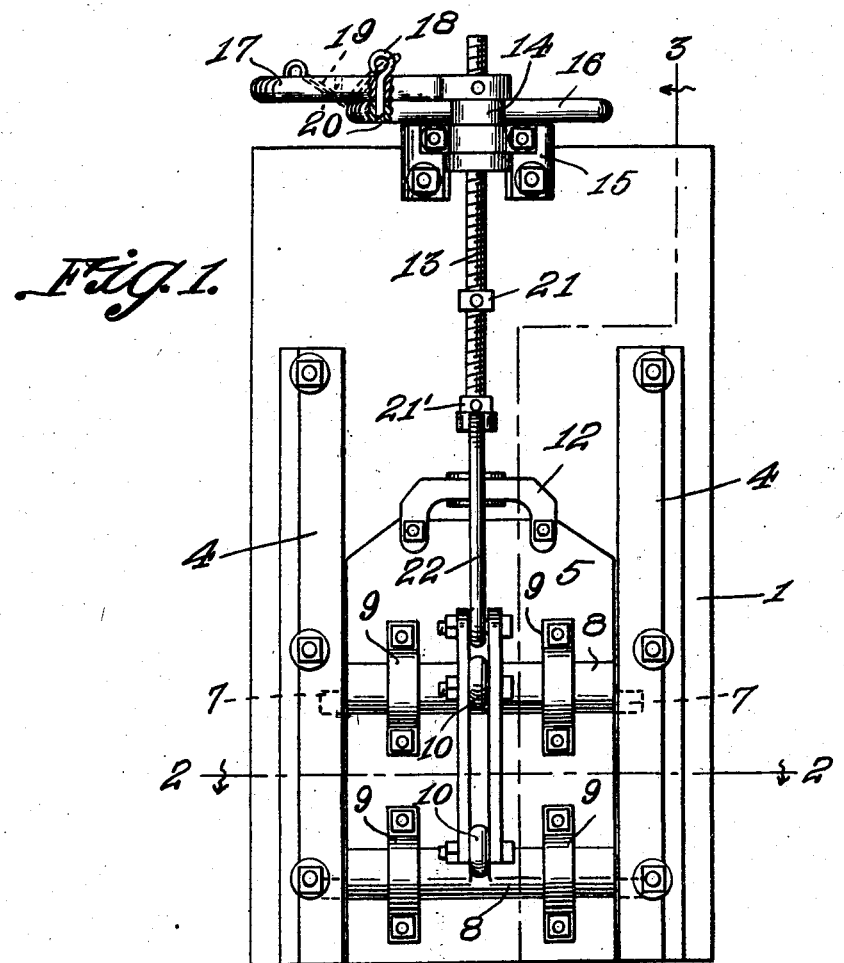
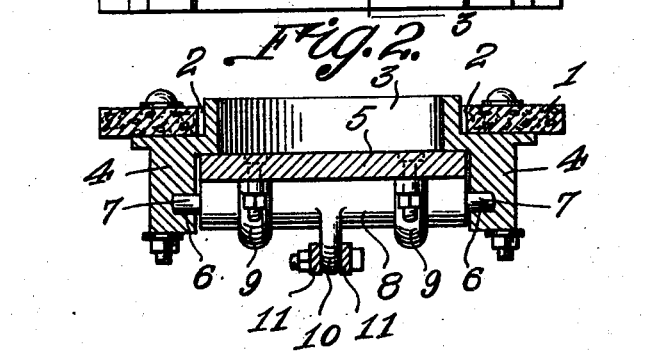
Preston Roots,
INVENTOR
BY Victor J. Evans
ATTORNEY May 31, 1927.
P. ROOTS
DITCH GATE
Filed Aug. 20, 1926
1,630,407
2 Sheets-Sheet 2
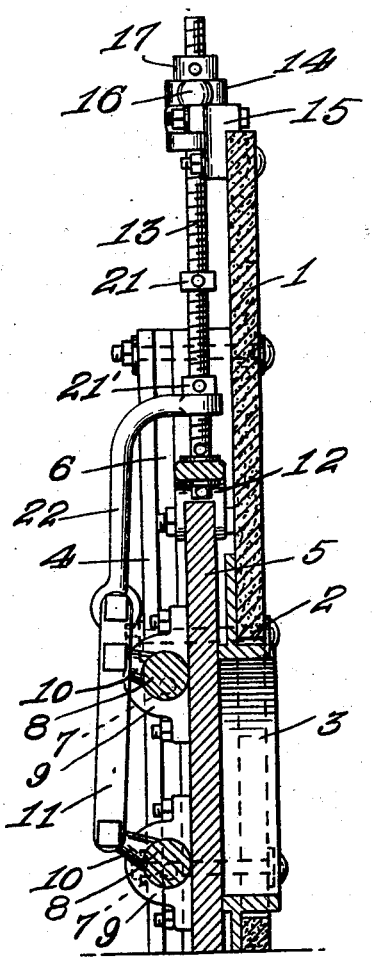
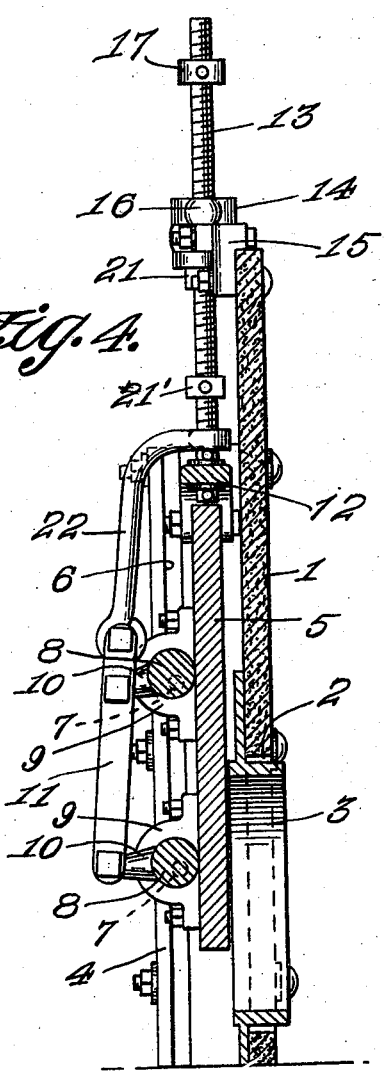
Preston Roots,
INVENTOR Patented May 31, 1927.

1,630,407

UNITED STATES PATENT OFFICE.

PRESTON ROOTS, OF SAN BENITO, TEXAS.

DITCH GATE.

Application filed August 20, 1926. Serial No. 130,533.

This invention relates to a gate for irrigating systems, the general object of the invention being to provide means for moving the gate vertically in its support and also for moving the gate horizontally when in its lowered position to cause the same to engage and disengage its seat.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation of the improved gate.

Figure 2 is a section on line 2—2 of Figure 1.

Figure 3 is a section on line 3—3 of Figure 1, showing the gate closed.

Figure 4 is a similar view, showing the gate open.

In these views, 1 indicates a portion of the head wall in which the opening 2 is formed, a seat 3 being provided for the opening. Vertical beams 4 are bolted to the wall, one at each side of the opening and these beams are preferably formed with the seat, as shown in Figure 2. These beams form a guiding space for the gate 5 and each beam is provided with a vertical groove 6 which receive the eccentric ends 7 of the shafts 8 which are journaled in the bearings 9 on the gate. Each shaft is provided with an outwardly extending arm 10 and the arms are connected together by the link 11. A bracket 12 is fastened to the upper end of the gate and the lower end of a screw shaft 13 is rotatably connected with the said bracket. The said shaft passes through a nut member 14 which is rotatably supported at the upper end of the wall by the structure 15, the nut member being provided with the handles 16 by which it can be rotated. A handle 17 is fastened to the upper end of the shaft and a pin 18 is fastened to the handle by the chain 19 and said pin is adapted to pass through the holes 20 in the handle 17 and in one of the handles 16 to connect the two handles together. Another hole may be formed in the handle 17 to support the pin when it is not connecting the two handles together.

A stop collar 21 is fastened to the shaft to limit the upward movement thereof by striking against a part of the nut member, and a second stop collar 21' is fastened to the lower part of the shaft. A curved bar 22 is pivoted to the link 11 and has a threaded hole in its horizontal part through which the shaft 13 passes.

From the foregoing, it will be seen that when the gate is in lowered position, the two handles will be in engagement and by placing the pin 18 in the two holes 20, the handles will be locked together so that by moving one handle, both the shaft and the nut member will be rotated. Thus the shaft will be held against vertical movement while being rotated and this will cause the rod 22 to move downwardly by its threaded hole engaging the shaft so that the shafts 8 will be rocked and thus the gate will be moved away from its seat. Then the pin 18 is pulled from the holes and the nut member is turned by its handles 16 while holding the handle 17 stationary. This will cause the shaft to move vertically and draw the gate upwardly to uncover the opening 2. When the gate is to be closed, the parts are moved in a reverse direction, as will be understood.

This invention is mainly designed for heavy gates.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A water gate of the class described comprising a frame, guideways therein, a gate slidably mounted between the guideways, shafts rotatably mounted on the gate and having eccentric ends engaging the guideways, an arm on each shaft, a rod connected with the arms and having a horizontal part provided with a threaded hole, a screw shaft connected with the top of the gate and passing through the said hole, a nut member rotatably supported and through which the shaft passes, a handle on the nut member and a handle on the shaft.

2. A water gate of the class described comprising a frame, guideways therein, a gate slidably mounted between the guideways, shafts rotatably mounted on the gate and having eccentric ends engaging the guideways, an arm on each shaft, a rod connected with the arms and having a horizontal part provided with a threaded hole, a screw shaft connected with the top of the gate and passing through the said hole, a nut member rotatably supported and through which the shaft passes, a handle on the nut member, a handle on the shaft and means for connecting the two handles together so that both the shaft and the nut member can be rotated in unison to cause the shaft and the eccentrics to move the gate horizontally.

In testimony whereof I affix my signature.

PRESTON ROOTS.